United States Patent
Birnkrant et al.

(10) Patent No.: US 11,944,857 B2
(45) Date of Patent: Apr. 2, 2024

(54) PRINTED CAPACITIVE LIQUID LEVEL SENSOR FOR FIRE SUPPRESSION

(71) Applicant: Carrier Corporation, Palm Beach Gardens, FL (US)

(72) Inventors: Michael John Birnkrant, Wethersfield, CT (US); Marcin Piech, East Hampton, CT (US); May L. Corn, Manchester, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 294 days.

(21) Appl. No.: 17/254,944

(22) PCT Filed: Sep. 26, 2019

(86) PCT No.: PCT/US2019/053070
§ 371 (c)(1),
(2) Date: Dec. 22, 2020

(87) PCT Pub. No.: WO2020/112227
PCT Pub. Date: Jun. 4, 2020

(65) Prior Publication Data
US 2021/0283447 A1    Sep. 16, 2021

Related U.S. Application Data

(60) Provisional application No. 62/773,260, filed on Nov. 30, 2018.

(51) Int. Cl.
*A62C 37/50* (2006.01)
*A62C 35/02* (2006.01)
*G01F 23/263* (2022.01)

(52) U.S. Cl.
CPC ............ *A62C 37/50* (2013.01); *A62C 35/023* (2013.01); *G01F 23/268* (2013.01)

(58) Field of Classification Search
CPC .......... G01F 23/76; G01F 23/66; G01F 23/68; G01F 23/62; G01F 23/72; A62C 35/02; A62C 35/023; A62C 37/50
See application file for complete search history.

(56) References Cited

U.S. PATENT DOCUMENTS 2,999,230 A * 9/1961 Laakmann ............ G01F 23/265
331/172
4,280,126 A    7/1981 White
(Continued)

FOREIGN PATENT DOCUMENTS

CN    204563401 U    8/2015
CN    105675092 A    6/2016
(Continued)

OTHER PUBLICATIONS

European Search Reported dated Feb. 15, 2023 for European Patent Application No. 22202271.7.
(Continued)

*Primary Examiner* — Christopher R Dandridge
(74) *Attorney, Agent, or Firm* — Bachman & LaPointe, P.C.

(57) ABSTRACT

A fire suppressant storage device (20) comprising: a tank (22) having a first port and an interior for storing fire suppressant; and a discharge assembly mounted to the first port. The discharge assembly has a discharge valve (48) and a discharge conduit (50) at least partially within the interior. The discharge conduit has an interior surface (60) and an exterior surface (58). The discharge assembly further comprises a gauge (80) on the discharge conduit.

20 Claims, 5 Drawing Sheets

(56) References Cited

U.S. PATENT DOCUMENTS

| | | | |
|---|---|---|---|
| 4,384,486 A | 5/1983 | Eckert | |
| 5,481,197 A | 1/1996 | Sanders et al. | |
| 5,698,269 A * | 12/1997 | Carlblom | B05B 5/087 |
| | | | 427/486 |
| 6,490,920 B1 | 12/2002 | Netzer | |
| 6,836,217 B2 | 12/2004 | Andreas | |
| 6,857,313 B2 | 2/2005 | Williamson | |
| 7,526,961 B2 | 5/2009 | Downie et al. | |
| 7,905,145 B2 | 3/2011 | Naydenov | |
| 8,418,774 B2 | 4/2013 | Gensel et al. | |
| 9,302,128 B2 | 4/2016 | Dunster et al. | |
| 9,658,095 B2 | 5/2017 | Winkens et al. | |
| 2004/0164868 A1* | 8/2004 | Thomas | F17C 13/025 |
| | | | 340/605 |
| 2011/0155262 A1 | 6/2011 | Ante et al. | |
| 2012/0111870 A1* | 5/2012 | Hodgson | G01F 23/24 |
| | | | 73/304 R |
| 2014/0157890 A1 | 6/2014 | Malinen et al. | |
| 2015/0040659 A1 | 2/2015 | Yu | |
| 2017/0146477 A1* | 5/2017 | Di Sarno | A62C 13/76 |

FOREIGN PATENT DOCUMENTS

| | | | | |
|---|---|---|---|---|
| CN | 205373827 U | 7/2016 | | |
| DE | 3731793 A1 | 3/1989 | | |
| EP | 0119790 A1 | 9/1984 | | |
| GB | 1389015 A | 4/1975 | | |
| WO | 2004/008084 A1 | 1/2004 | | |
| WO | WO-2011087217 A2 * | 7/2011 | | G01L 9/0072 |

OTHER PUBLICATIONS

International Search Report and Written Opinion dated Dec. 5, 2019 for PCT/US2019/053070.

* cited by examiner

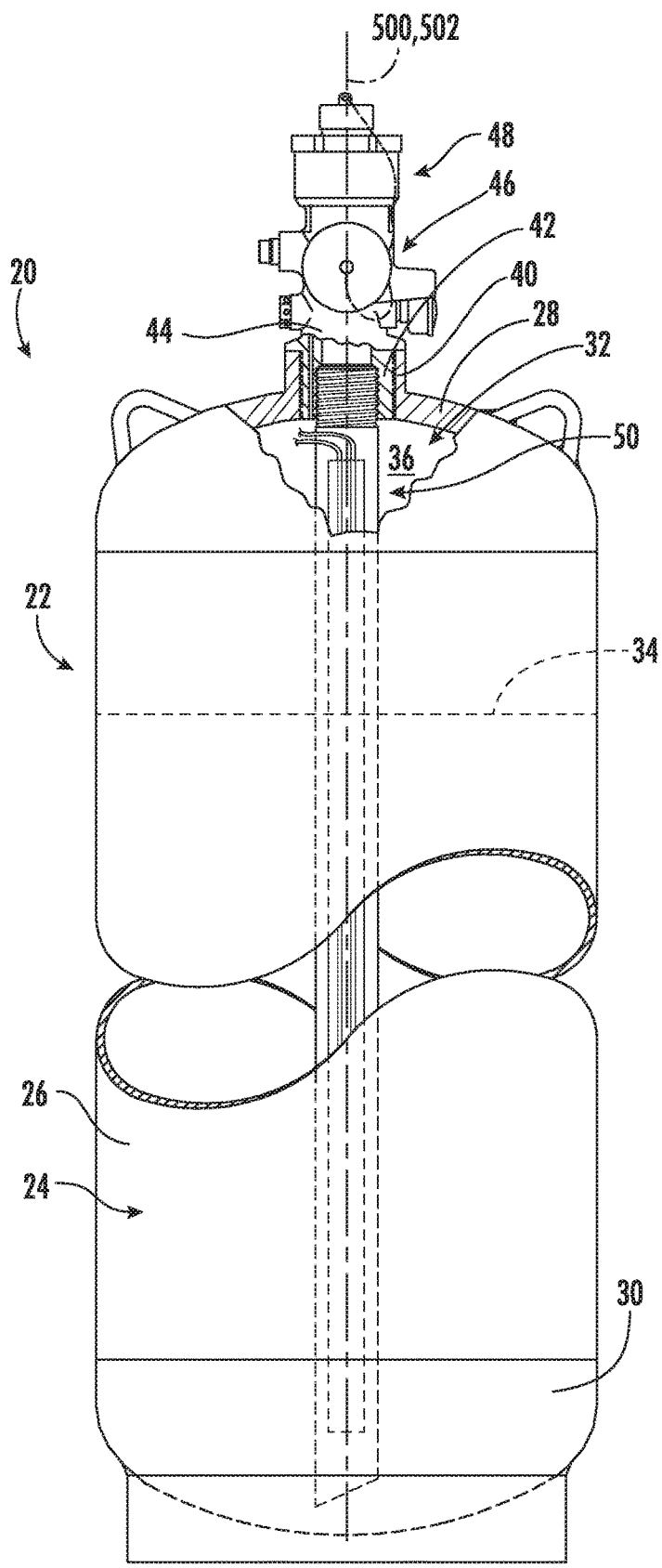
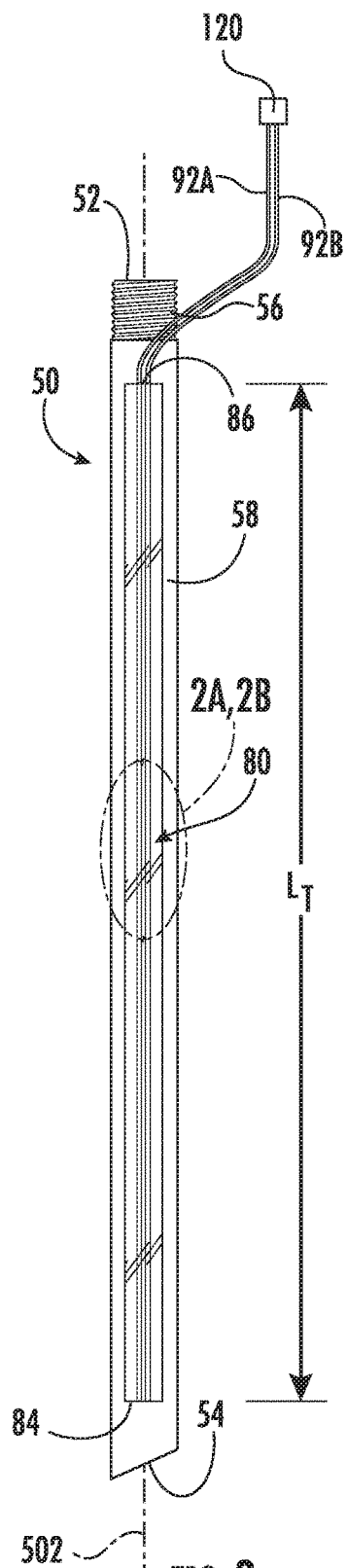
FIG. 1
FIG. 2

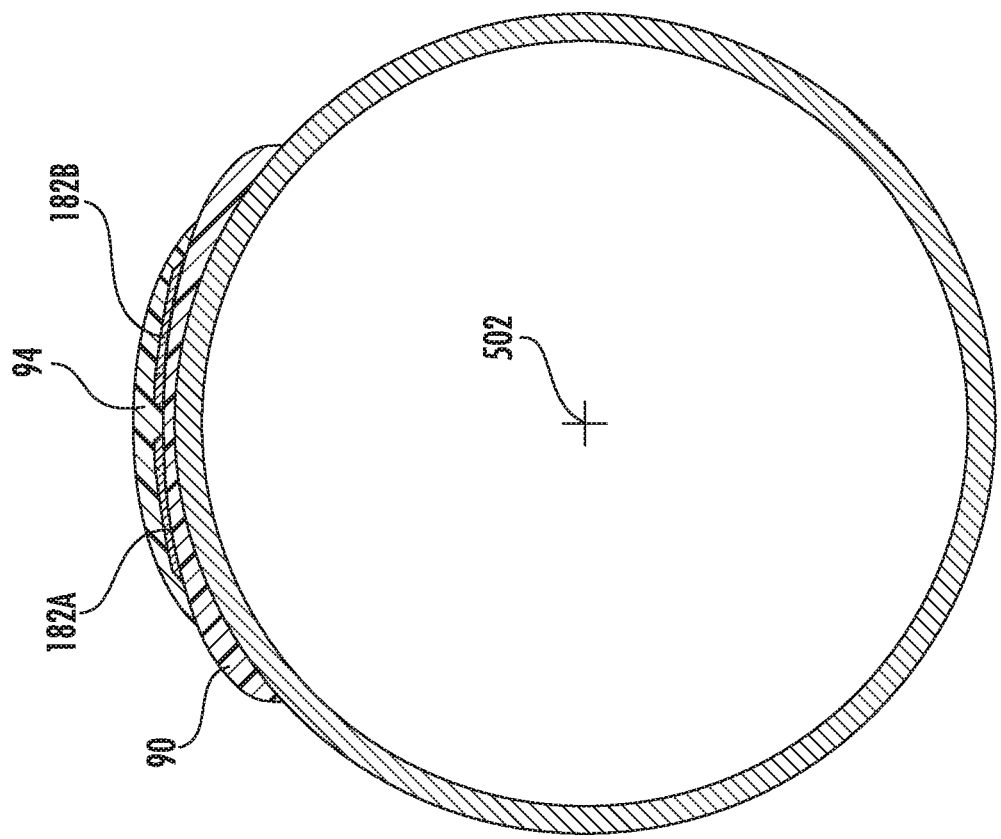
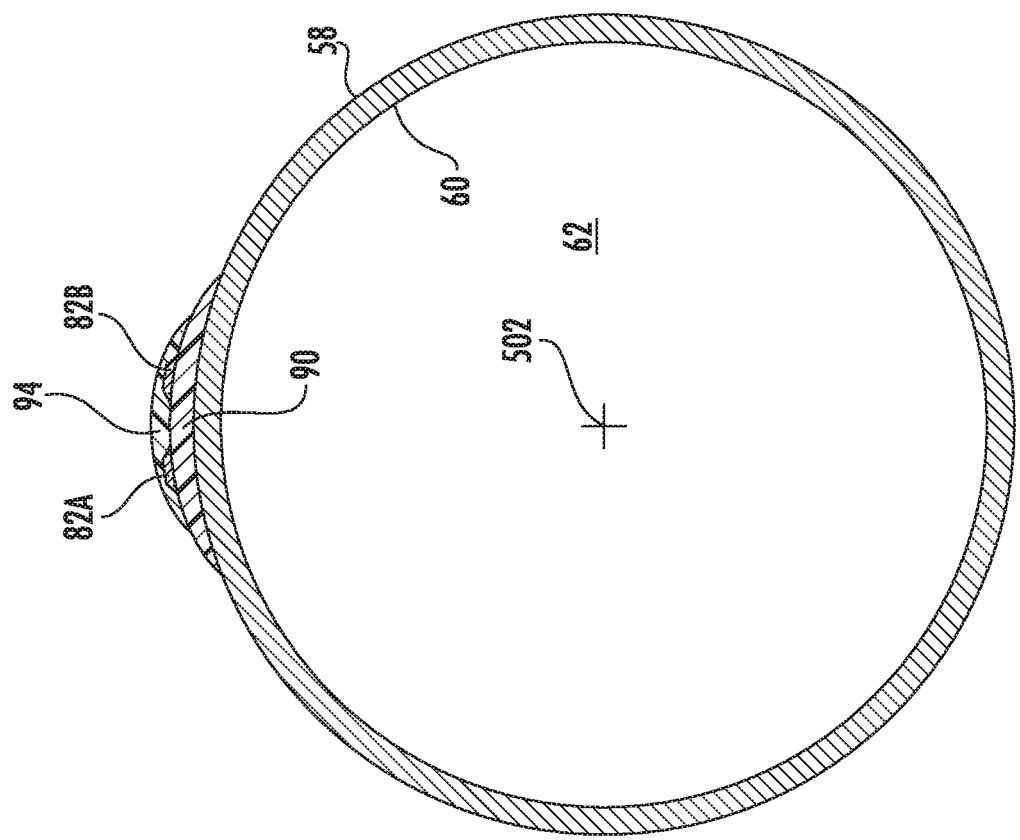
FIG. 4
FIG. 3

PRINTED CAPACITIVE LIQUID LEVEL SENSOR FOR FIRE SUPPRESSION

CROSS-REFERENCE TO RELATED APPLICATION

Benefit is claimed of U.S. Patent Application No. 62/773,260, filed Nov. 30, 2018, and entitled "Printed Capacitive Liquid Level Sensor for Fire Suppression", the disclosure of which is incorporated by reference herein in its entirety as if set forth at length.

BACKGROUND

The disclosure relates to fire suppression. More particularly, the disclosure relates to level sensing in systems using liquid agents.

Liquid fire suppression agents have been used for decades. Although some agents such as hydrofluorocarbon (HFC) (e.g. Halon 1301 (bromotrifluoromethane) and HFC-227ea (heptafluoropropane)) are in disfavor due to environmental concerns, replacements are readily commercially available, such as a fluoroketone formulated as dodecafluoro-2-methylpentan-3-one (1,1,1,2,2,4,5,5,5-nonafluoro-4-(trifluoromethyl)-3-pentanone) ($CF_3CF_2C(O)CF(CF_3)_2$) (ASHRAE nomenclature FK-5-1-12). Such agents are typically used with a pressurant/propellant such as nitrogen ($N_2$). Kidde-Fenwal, Inc. of Ashland, Massachusetts manufactures an exemplary fire suppression system, the Kidde® ADS™ Other suppressant agents and pressurants/propellants may be used in fire suppression systems as necessary to meet desired fire suppression capabilities.

Typically such agents are stored as a liquid in one or more metal tanks (e.g., steel tanks having a cylindrical centerbody and domed ends, although other shapes and materials are also known in the art). A tank is typically positioned with its axis vertical so that one end is an upper end or top and the other a lower end or base. The upper end typically has a number of ports with fittings (e.g., threaded fittings). Typically a large center port receives a discharge assembly. The discharge assembly may include a fitting portion mated to the tank fitting and an external valve (e.g., automatically controllable via a control system). A discharge conduit (also known as a siphon tube or dip tube) extends downward into the tank and typically has an open lower end near the bottom of the tank. In facility configurations requiring multiple tanks, the tanks may be connected to a suppression system serially, independently, or in distributed locations in different configurations, and may be co-located or distributed throughout a facility. The suppression system includes piping from the tank(s) to endpoints such as discharge nozzles. Various pressure regulators and controllable valves may be located along the piping to provide selective discharge of suppressants at locations of fire.

Due to their low heat of evaporation and high vapor pressure (e.g., relative to water), typical liquid fire suppression agents will rapidly vaporize at discharge from the nozzle outlets and thus be delivered as vapor.

If the discharge valve is opened, pressure in the tank headspace (e.g., from the pressurant/propellant noted above) is sufficient to drive liquid suppressant up through the discharge conduit and out of the tank. Pre-use, the surface level of liquid in the tank will typically be well into the upper half of the tank. The exact position will depend on factors including the nature of the suppressant, the nature of the pressurant/propellant (e.g. composition and whether internally or externally located), and the application.

It is necessary to at least occasionally measure the fluid level in the tank (e.g., safety regulations typically require semi-annual inspection including verification of agent amount). To do this without venting the tank, several liquid level measurement systems have been proposed. A number of these systems make use of an additional vertically-extending conduit mounted to an additional port in the tank upper end. Typically, the tanks may be provided with multiple smaller off-center ports (e.g., with internally-threaded fittings) in addition to the center port. These ports may serve for various functions. An exemplary such liquid level sensing system has a fitting mounted to one of those additional port fittings with a conduit (e.g., metal tube) extending vertically down toward the base of the tank. Unlike the discharge conduit, the lower end of this liquid level sensing tube is closed so that the interior of the liquid level sensing tube is sealed relative to the surrounding interior of the tank. A float may surround the liquid level sensing tube. The float may be magnetized. The float may magnetically interact with a member movable within the tube to in turn provide indication of the liquid level.

In one basic example of such a liquid level sensing system, the liquid level sensing fitting, in turn, has a removable cap or plug providing access to the upper end of the tube. A magnetic weight at the end of a measuring tape, string, or other device, may be located in the tube. The magnetic weight will interact with the float to be held at the same level as the float and thus at the level of the surface of liquid in the tank. This allows the level of the surface of liquid in the tank to be measured relative to the liquid level sensing fitting and thus relative to any other reference on the tank. Such measurements are typically taken periodically manually by a person assigned to the task. In one example where the weight and measuring tape are already in the tube, the end of the tape opposite the weight may be connected to the removable cap or plug. The user may open the cap or plug and pull to take up slack in the measuring tape. The user may take a reading with the tape to determine the liquid level of the tank.

Yet more complex systems are automated with the magnetic weight permanently within the tube and its vertical position electronically measured. Yet other systems involve capacitive measurements between inner and outer tubes. However, such systems are often costly, inaccurate, subject to separate maintenance, or require some manual measurement and are thus time-consuming and prone to human error.

SUMMARY

One aspect of the disclosure involves a fire suppressant storage device comprising: a tank having a first port and an interior for storing fire suppressant; and a discharge assembly mounted to the first port. The discharge assembly has a discharge valve and a discharge conduit at least partially within the interior. The discharge conduct has an interior surface and an exterior surface. The discharge assembly further comprises a gauge on the discharge conduit.

In one or more embodiments of any of the foregoing embodiments, the gauge is a capacitive gauge is along the exterior surface.

In one or more embodiments of any of the foregoing embodiments, the gauge comprises: a first conductor; and a second conductor spaced apart from the first conductor.

In one or more embodiments of any of the foregoing embodiments, the gauge further comprises: a first insulative layer between the first conductor and the discharge conduit; and a second insulative layer over the first conductor and the second conductor.

In one or more embodiments of any of the foregoing embodiments, the first and second insulative layers are polymeric layers.

In one or more embodiments of any of the foregoing embodiments, the first and second insulative layers comprise a polyimide.

In one or more embodiments of any of the foregoing embodiments, the gauge further comprises: a plurality of first branches of the first conductor extending away from the second conductor; and a plurality of second branches of the second conductor extending away from the first conductor opposite respective said first branches.

In one or more embodiments of any of the foregoing embodiments, the fire suppressant storage device further comprises said fire suppressant within the tank interior, the discharge conduit at least partially immersed in the fire suppressant.

In one or more embodiments of any of the foregoing embodiments, said fire suppressant comprises a clean agent.

In one or more embodiments of any of the foregoing embodiments, the fire suppressant storage device further comprises a compressed gas propellant in a headspace of the tank.

In one or more embodiments of any of the foregoing embodiments, the tank has a second port. A closure seals the second port. First and second leads from the gauge extend to the closure.

In one or more embodiments of any of the foregoing embodiments, an electronics module is electrically coupled to the gauge and comprises a function generator for supplying an AC signal to the gauge.

In one or more embodiments of any of the foregoing embodiments, the electronics module is configured to split an output of the function generator between said signal to the gauge and a signal to a reference capacitor.

In one or more embodiments of any of the foregoing embodiments, a method for using the fire suppressant storage device comprises: applying a voltage across the gauge; and measuring a response of the gauge.

In one or more embodiments of any of the foregoing embodiments: the applying a voltage comprises applying an AC signal; and the measuring a response comprises taking a difference between said AC signal and an AC signal applied to a reference capacitor.

In one or more embodiments of any of the foregoing embodiments, the method further comprises, from the response, determining a level of said fire suppressant in the tank.

Another aspect of the disclosure discloses a method for manufacturing a fire suppressant discharge assembly. The discharge assembly comprises a discharge valve; and a discharge conduit. The discharge conduit has an interior surface; and an exterior surface. The method comprises forming in situ on the discharge conduit, a gauge having a first conductor and second conductor.

In one or more embodiments of any of the foregoing embodiments, the method further comprises prior to the forming in situ of the first conductor and the second conductor, forming in situ a first polymeric layer on the discharge conduit; and after the forming in situ of the first conductor and the second conductor, forming in situ a second polymeric layer over the first conductor, the second conductor, and the first polymeric layer.

In one or more embodiments of any of the foregoing embodiments, the forming in situ of the first conductor and the second conductor comprises spraying.

In one or more embodiments of any of the foregoing embodiments, the method further comprises connecting respective first and second leads to the first and second conductors by conductive paste.

Another aspect of the disclosure involves a method for forming a liquid level measurement gauge on a surface of a substrate. The method comprises spray forming a first conductor and a second conductor atop the surface.

Another aspect of the disclosure involves a liquid level measurement device comprising: a substrate for immersion in a body of liquid and having a surface; and a first conductor and a second conductor atop the surface. In some embodiments, the substrate may be a tube.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 1 is a partially cutaway view of a fire suppressant storage device.

FIG. 2 is a view of a discharge conduit of the device.

FIG. 3 is a transverse sectional view of the gauge of FIG. 2A, taken along line 3-3.

FIG. 4 is a transverse sectional view of the gauge of FIG. 2B, taken along line 4-4.

Like reference numbers and designations in the various drawings indicate like elements.

DETAILED DESCRIPTION

Figure 2A:
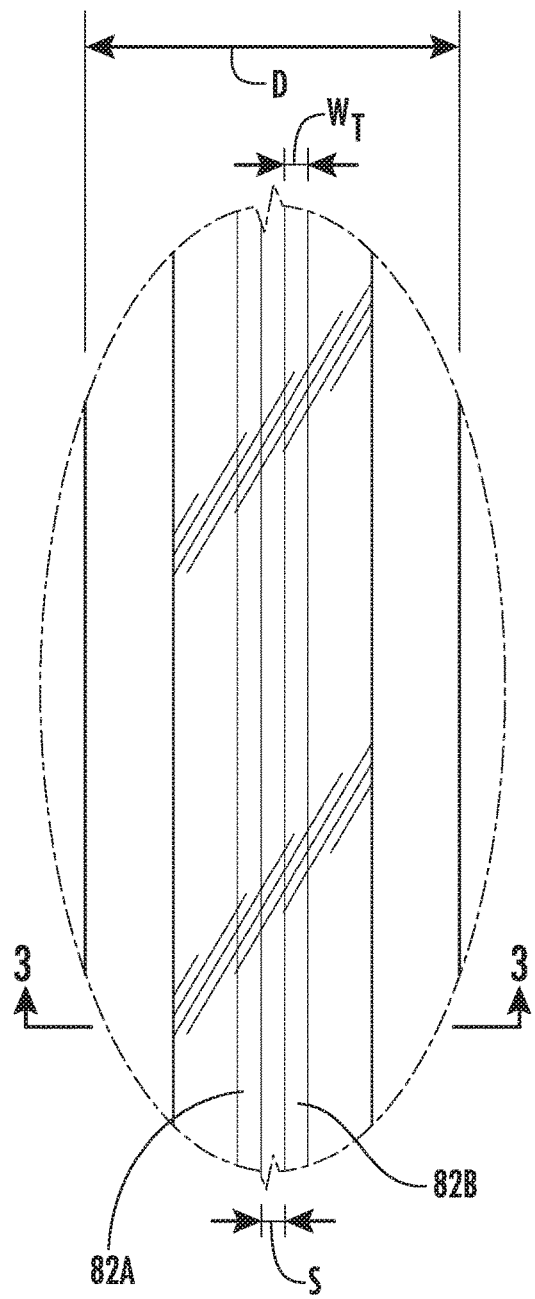
FIG. 2A is an enlarged view of a capacitive gauge along the discharge conduit.

FIG. 1 shows a fire suppression storage device 20 including a tank 22. The exemplary tank 22 has a body 24 including a cylindrical centerbody section 26 defining a central longitudinal axis 500. In an exemplary installation situation, the axis 500 is vertical. The tank 22 has respective upper and lower domed end portions 28 and 30. Exemplary tank materials are metal (e.g., steel or aluminum alloy) and the tank may represent any of numerous existing or yet-developed tank configurations. The tank has an interior 32 which, in pre-discharge condition, contains a body of liquid suppressant (agent) shown having a surface 34 leaving a headspace 36 thereabove to contain compressed gas pressurant/propellant. The upper end portion 28 bears a center port surrounded by a fitting 40 (e.g., internally-threaded or externally-threaded). The exemplary fitting 40 receives a lower externally threaded portion 42 of a body 44 of a discharge valve assembly 46 having a discharge valve 48. The discharge valve assembly 46 combines with a discharge conduit (e.g., a metal tube) 50 to form a discharge assembly.

Exemplary suppressants are HFCs or non HFC agents such as FK-5-1-12 mentioned above. Suppressants may broadly include "clean agents" and aqueous agents. A "clean agent" is defined as an "electrically nonconductive, volatile, or gaseous fire extinguishant that does not leave a residue upon evaporation." National Fire Protection Association (NFPA) Standard for Clean Agent Fire Extinguishing Systems—NFPA 2001.

Further "clean agents" include halocarbons (haloalkanes, haloketones, haloacids and the like) and their blends. Specific examples include fuoroform (HFC-23), bromotrifluoromethane (Freon 13B1), trifluoroiodomethane (Freon 13T1), pentafluoroethane (HFC-125), 1,1,1,2,3,3,3-heptafluoropropane (HFC-227ea), and the like. Exemplary pressurant/propellant is $N_2$, argon (Ar), carbon dioxide ($CO_2$), or blends.

As shown in FIG. 2, the exemplary discharge conduit 50 extends from an upper end 52 to a lower end 54. An exemplary portion 56 adjacent the upper end 52 is externally threaded and received in an internally threaded bore of the discharge valve body lower portion 42. In operation, the lower end 54 is well below the liquid surface 34 (FIG. 1) so that pressure in the headspace 36 (FIG. 1) will drive suppressant upward through the discharge tube if the discharge valve is open. In the exemplary installed condition, the discharge conduit axis 502 (FIGS. 1-4) is coincident with the tank axis 500.

As so far described, the fire suppressant storage device is representative of one exemplary configuration of many existing or yet-developed configurations to which the following teachings may apply. FIG. 2, however, shows a liquid level sensing gauge 80 on the discharge conduit 50. The exemplary gauge 80 may be a capacitive gauge whose capacitance is affected by the presence of surrounding liquid. The exemplary gauge 80 is positioned on/along the conduit 50 exterior or outer diameter (OD) surface 58 (diameter D) running generally longitudinally. The gauge 80 comprises two main conductors shown as traces 82A, 82B (FIG. 2A). The exemplary traces are parallel, each having a length $L_T$ and a width $W_T$ (FIG. 2A) and having a spacing S (FIG. 2A) between the traces. The traces each extend from a lower end 84 (FIG. 2) to an upper end 86. FIG. 3 shows the traces 82A, 82B on the OD surface 58 of the conduit 50. An interior or inner diameter (ID) surface 60 is also shown surrounding an interior 62 of the conduit.

The exemplary traces 82A, 82B may be applied in situ via an additive manufacturing technique (e.g., 3D printing such as spraying (e.g., of metallic particles in a jet or aerosol jet), screen printing (e.g., using a screen and stencil), or paste (e.g., metallic particles in an aqueous or organic medium) extrusion (under pressure through a nozzle)). Exemplary metals for the traces include copper, silver, nickel, gold and alloys including such metals. An initial such application step may be followed by a hardening (e.g., drying or curing step). In an exemplary hardening, the conduit is treated by heat above room or standard temperature. An exemplary heat range is by 50° C. to 400° C. Exemplary heating may be via infrared (IR). Other curing may involve ultraviolet irradiation or plasma treatment. In some cases individual layers or subgroups of layers are so dried or cured before applying subsequent layers or groups, and so forth. In others cases the heating or curing occurs only after all layers are applied.

In one example the gauge or trace 80 (82A, 82B-FIG. 2A) length $L_T$ is 800 mm, the trace width $W_T$ (FIG. 2A) is 0.5 mm and the trace spacing S is 0.1 mm. In most cases the length $L_T$ is dictated by the length of the discharge conduit 50, which can range from 10 mm to 2000 mm, more typically 250 mm to 2000 mm. Typically, the length $L_T$ will be at least 25% of a height of the tank interior (e.g., 15% to 100% or 25% to 95%). The width $W_T$ of the traces 82A, 82B may be influenced by the spray technique and may range from 0.01 mm to 20 mm or 0.01 to 2.0 mm or 0.10 mm to 1.0 mm. It is also desirable to minimize the spacing S to increase sensitivity. The minimum spacing is influenced by deposition technique. During the printing, overspray and fluctuations on the surface may result in the traces having local variations in the spacing. It is undesirable to have the two parallel traces 82A, 82B touch, so nominal spacing S (and associated on-center spacing S+$W_T$) may be selected to reduce the likelihood of the two traces touching. An exemplary spacing S is 0.1 mm, more broadly 0.05 mm to 1.0 mm or 0.01 mm to 3.0 mm depending on printing technique.

With reference to FIGS. 1-3, in an exemplary implementation, after machining of the conduit (e.g., and threading the portion 56) an electrically insulative base layer 90 (FIG. 3) may be applied in the region of the OD surface 58 to be occupied by the gauge 80. Thus, the tube 50 forms an ultimate substrate for the traces 82A, 82B with the layer 90 intervening. The exemplary layer 90 may be a polymeric material such as a polyimide although other suitable insulative material may also be used such as glass or ceramic material. This may be applied (formed) in situ by a process such as spraying (e.g., as noted above for the conductors). Alternatively, a tape pre-form (e.g., adhesive-backed) may be used. After application of the layer 90, the traces 82A, 82B may be applied. Thereafter, leads 92A, 92B (FIG. 2) may be electrically connected to the traces such as by gluing via electrically conductive paste (time cured, heat cured, or UV cured) or soldering or welding. Thereafter, an encapsulating insulative layer (encapsulant) 94 (FIG. 3—e.g., also polymeric such as polyimide or other suitable insulative material such as glass or ceramic material) may be applied over the traces 82A, 82B to protect them from the liquid suppressant (e.g., via the same or similar in situ technique).

As is seen in the example of FIG. 3, the exemplary encapsulant 94 prevents any suppressant from coming directly between the traces 82A and 82B. Nevertheless, the presence of suppressant along the outer surface of the encapsulant laterally away from the immediate gap between traces still allows capacitive measurement via a fringe effect. Fringe field lines between the traces will pass outward through either the liquid or empty space in the vessel (tank). Thus, the presence of liquid versus empty space affects capacitive behavior and thus allows for measurement of liquid level.

Figure 5:
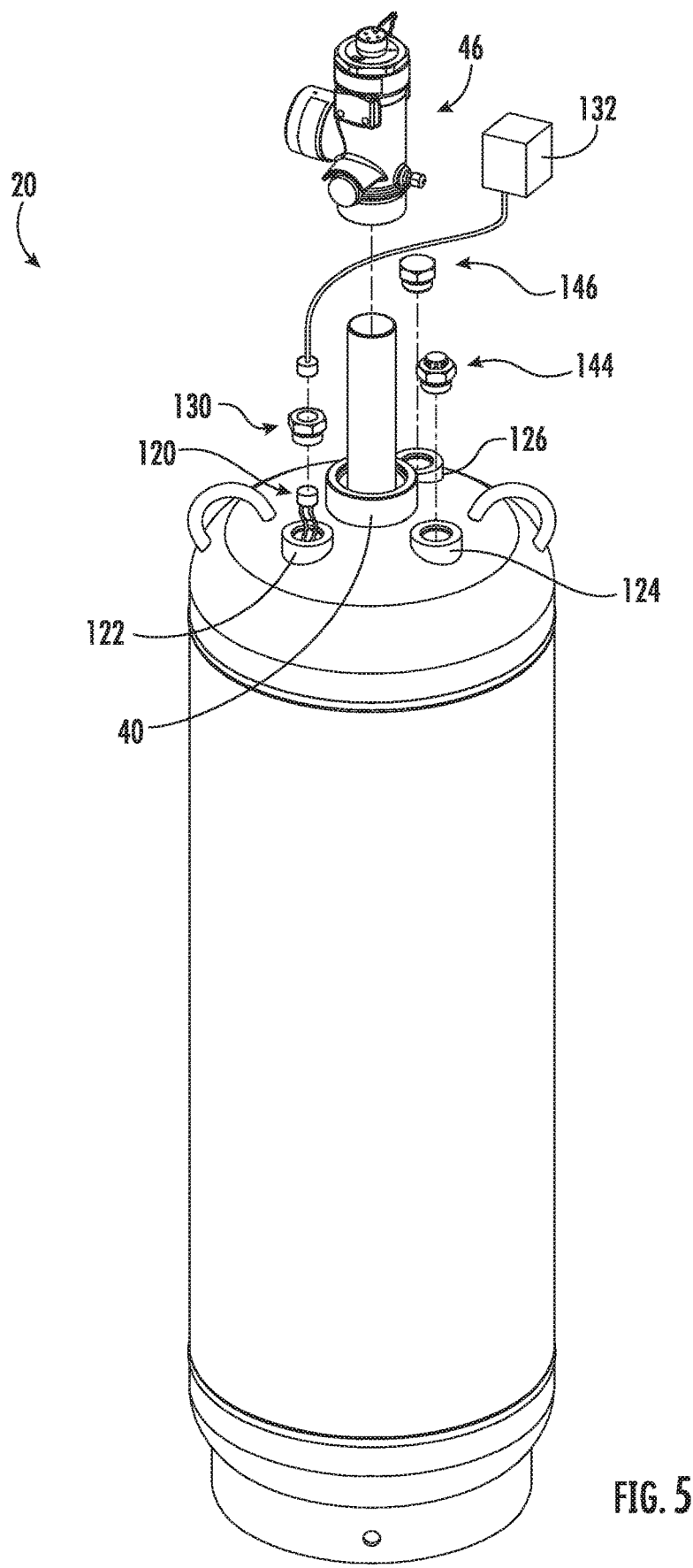
FIG. 5 is a partially exploded view of the device.

Numerous options exist for electrically connecting the traces 82A and 82B to equipment measuring the capacitive behavior. In one example (not shown) an electronics module may be mounted to the discharge conduit and may include a battery for providing the necessary power. The electronics module may further include a radio communicating over a protocol (e.g., Bluetooth, WiFi, ZigBee, or other suitable protocol), infrared, or optical communication to communicate with an external device. However, in the illustrated example, the leads 92A, 92B pass electrical stimulus to and from outside of the tank. In one example, the leads may pass to a connector 120 (FIG. 2) with contacts complementary to those of an additional connector 130 (FIG. 5) that mounts to one of the ports to also act as a closure for such port. For example, FIG. 5 shows three off-axis ports 122, 124, and 126. All are internally-threaded. In an exemplary implementation of a retrofit from a system having a liquid level sensing tube mounted to the port 122, the port 122 may instead include a connector 130 having lower contacts for mating with those of the connector 120 and upper contacts for mating with wiring to an electronics module 132 (e.g., mounted to the discharge valve body).

In yet other examples (not shown), which may be suitable for retrofit of existing tanks, the liquid level measurement assembly may be separate from the discharge tube 50. The gauge 80 traces 82A, 82B may be on an elongate substrate such as a tube or rod separate from the discharge tube. For example, the separate gauge traces may be applied to the tube or rod by similar techniques to applying to the discharge tube. That separate tube or rod may be passed through one of the spare ports (e.g., 122 after removing a baseline plug or cap) and secured thereto (e.g. a complementary fitting to fitting 122 mounting the proximal end of the tube or rod). The connector 120 may be integral with or separate from that fitting. In one example, the liquid level measurement assembly may include the substrate, the traces 82A, 82B, the leads 92A, 92B, the fitting, and the encapsulant 94. Exemplary tubes are metallic or non-metallic tubes with closed or open lower ends. Exemplary rods are metallic or non-metallic. Tube or rod length and gauge length may be as discussed for the gauge 80 on the discharge tube 50. However, the separate assembly may allow the lower end of the rod or tube to go all the way to the tank bottom or otherwise closer than the lower end of the discharge tube. Such a liquid level measurement assembly may be used to retrofit an existing tank without need to remove the discharge tube. In the case of an electrically non-conductive tube or rod material, the insulative base layer 90 between the traces and substrate may be omitted. Such a separate liquid level measurement assembly may be used, for example, in retrofits such as field retrofit of a remote driver system where the baseline plug can be removed from the fitting 122 and the assembly installed in its place while the tank is full of suppressant.

FIG. 5 also shows respective plugs 144 and 146 with the ports 124 and 126. These might respectively be re-fill ports, overpressure devices such as rupture disks or relief valves, auxiliary pressure gauges and the like. In alternative situations where an external pressurant/propellant is used (e.g., an external $N_2$ "driver" tank), one of the ports may couple to the driver tank or the driver tank may couple to the valve assembly.

In operation, the electronics module 132 may apply an alternating current (AC) signal across the gauge 80 and measure the resistance and capacitance. From these measurements, the module determines the liquid level. As liquid level increases and more of the gauge 80 is exposed to liquid, the effective capacitance decreases. This gives rise to many ways to use capacitance in the level measurement. One example involves the module 132 (FIG. 6) having a reference capacitor 320. Relative behavior of the gauge 80 and reference capacitor may then be used. A processor 322 may be programmed with a relationship between that relative behavior and fluid level (whether characterized as level or mass or volume or percentage). The processor 322 may display (via LCD, LED, or the like) the resulting liquid level or communicate it (e.g., via radio, infrared, optical, or hardwiring) to additional control and monitoring equipment.

Calibration would typically be necessary to determine gauge capacitance because nominally identical gauges may demonstrate a range of empty capacitance, for example, of 6000 nF to 1000 nF. In one example, a 60 cm long gauge 80 with an AC signal of one volt in amplitude and 10 Hz in frequency (discussed below), may have a capacitance about 6000 nF when empty and about 7200 nF when full of agent. The delta of 1200 nF equates to a capacitance change of 20 nF/cm of immersion. A range of 5 Hz to 1000 Hz or 1 Hz to 1000 Hz may be preferred; above 10 kHz sensitivity may drop; and near 1 Hz the signal may be too noisy. Changing voltage may affect the desirability of a frequency range, with higher voltage increasing field strength. Increased field strength will extend the fields radially outward into the liquid (below surface) or gas (above surface) increasing sensitivity and allowing higher frequencies to reduce noise. Thus, voltage and frequency may be traded off to trade-off between sensitivity and noise. In one example, a one volt, 10 Hz signal may be preferred. The upper end of the voltage range is limited by the breakdown voltage of the capacitor. Exemplary voltage ranges may be 0.1 V to 20 V or 0.5 V to 20 V.

Figure 6:
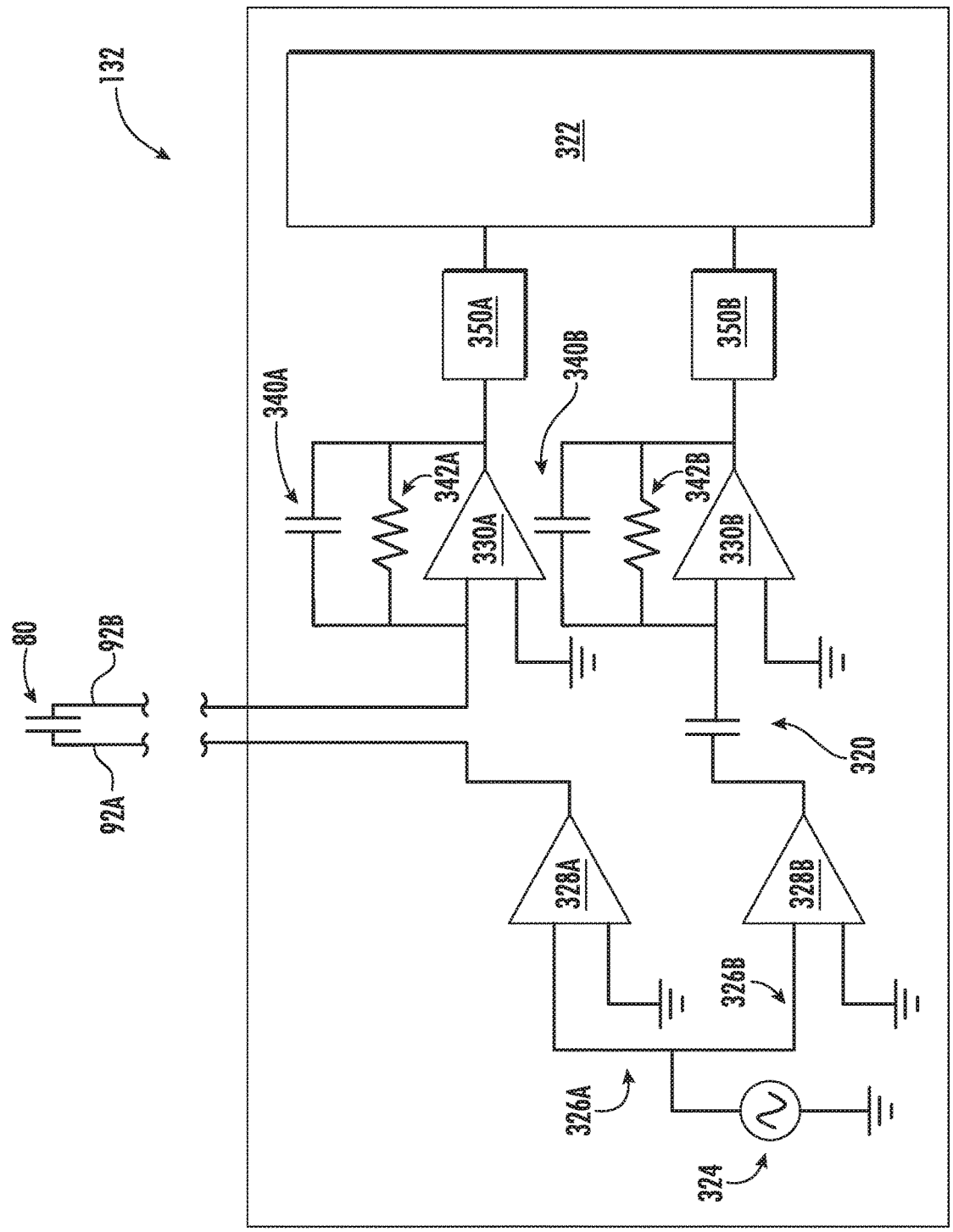
FIG. 6 is a schematic view of an electronics module for using the gauge.

The tank, sensor, gauges and electronics are exposed to electromagnetic interference (EMI) that may be accounted for in order to increase accuracy of a reading taken by a liquid level sensing gauge 80. The modified Wheatstone bridge illustrated in FIG. 6 is known to reduce noise in electronic circuits by balancing component values by subtracting EMI signals from two electronic components. The selection of frequency is also chosen based on the predicted source of EMI. In the case of an industrial application, 60-120 Hz EMI is generated by motors and power lines. So it is desirable to not include a range of frequencies needed for detection. As an example, a scan from 1 Hz to 1000 Hz may be preferred; but 60-120 Hz is omitted because of the noise level associated with conducted EMI. The choice in exact frequencies can be done at commissioning based on a commissioning algorithm that sweeps the frequency range of interest and selects frequencies based on the measured standard deviation of a signal.

In this particular FIG. 6 example of an electronics module 132 which includes an EMI filter, a function generator 324 may generate a predetermined AC signal. An exemplary AC signal is one volt in amplitude and 10 Hz in frequency as noted above. The function generator may include a power source (e.g., battery) and conventional AC signal generator circuitry (not shown). The output signal is split into two branch signals in two circuit branches 326A, 326B for the gauge 80 and reference capacitor 320. Along each branch, the split signal passes through an operational amplifier 328A, 328B (serving as buffer amplifiers) and then the respective gauge 80 and reference capacitor 320. Continuing along each branch, the amplifiers 328A, 328B take the signals in and then push them through the gauge 80 and the reference capacitor 320 making sure the two capacitors will not interfere with one another. Once the split signals pass through the gauge 80 and the reference capacitor 320 they may go to a respective second operational amplifier 330A, 330B.

Each second operational amplifier 330A, 330B amplifies the signal and filters it via a low pass filter. The low pass filter is provided by a respective capacitor 340A, 340B to filter out any high frequency noise and allow all low frequency signal to pass through. Amplification is achieved via the resistance of a resistor 342A, 342B in parallel with respective capacitor 340A, 340B. The resistance value of each resistor 342A, 342B will change the amplification value. When the signal exits the second operational amplifiers 330A, 330B this will be as an analog "signal one" (sensing signal) from the gauge 80 (exiting operational amplifier 330A) and an analog "signal two" (reference signal) from the reference capacitor 320 (exiting operational amplifier 330B). These may be converted to a digital sensing signal and digital reference signal, respectively, by analog-to-digital converters 350A, 350B. When the liquid level changes, the processor 322 will see the sensing signal (from converter 350A) change with respect to the reference signal (from converter 350B) in relation to how much liquid is in contact with the gauge 80. The processor 322 may be configured via hardwiring or programming to take the difference between those two signals to determine the liquid level.

Typically the reference capacitor 320 may be selected prior to manufacture of the system. The relative capacitance of the gauge 80 and reference capacitor 320 may be set in any of several ways. This might depend on the particular measuring situation. Detecting levels near empty may be important such as when a control system has to change the source of suppression agent over form one tank that is nearing empty to a fresh tank to maintain suppression or maintain a sustained inerting condition. For such in-use change-over purposes, one might prioritize precision near empty. Thus, one could select the capacitance of the reference capacitor 320 to match the sensing signal one and the reference signal where the most precise reading is desired.

In one example, relative capacitance of the gauge 80 and reference capacitor 320 may be set to be identical when the gauge 80 has no liquid exposure. Thus the signals would be identical with no liquid adjacent to gauge 80. In a second example, the relative capacitance may be selected for precision near full fill level, if detecting leaks from a tank that is supposed to be full is a primary concern. To achieve the most precise reading when the tank is full, capacitance may be selected to match the sensing signal and the reference signal when the liquid level is full. Different implementations may prioritize measurement at different locations (heights along the gauge and thus fill levels).

Calibration to determine gauge capacitance may be carried out as follows. In an exemplary implementation, an initialization is performed on an empty tank to acquire a baseline (relationship in the example above). This initialization calibrates the particular gauge to the particular tank/suppressant. The calibration addresses manufacturing variation in the gauge. This may typically be done in the factory. For example, the signal difference is measured empty. Then the tank is filled to acquire calibration. For example, the tank may be filled with a fixed amount of suppressant and a second calibration point established.

The fixed amount may be lower than the typical end use amount. In many situations, a given size tank is ultimately filled with a specific amount required by the end user. The calibration amount may be the minimum amount used by the domain of users. The relative signal properties at this calibration amount and the empty baseline may be used to program the processor 322 with a linear relationship from which flow level may be determined for other relative capacitance measurements associated with other levels.

Then, prior to shipment, the tank may be further filled to the final end use amount. At final shipment, a further measurement may be taken in the factory. If there is departure from the relationship determined previously, the relationship may be reprogrammed in the processor 322.

Figure 2B:
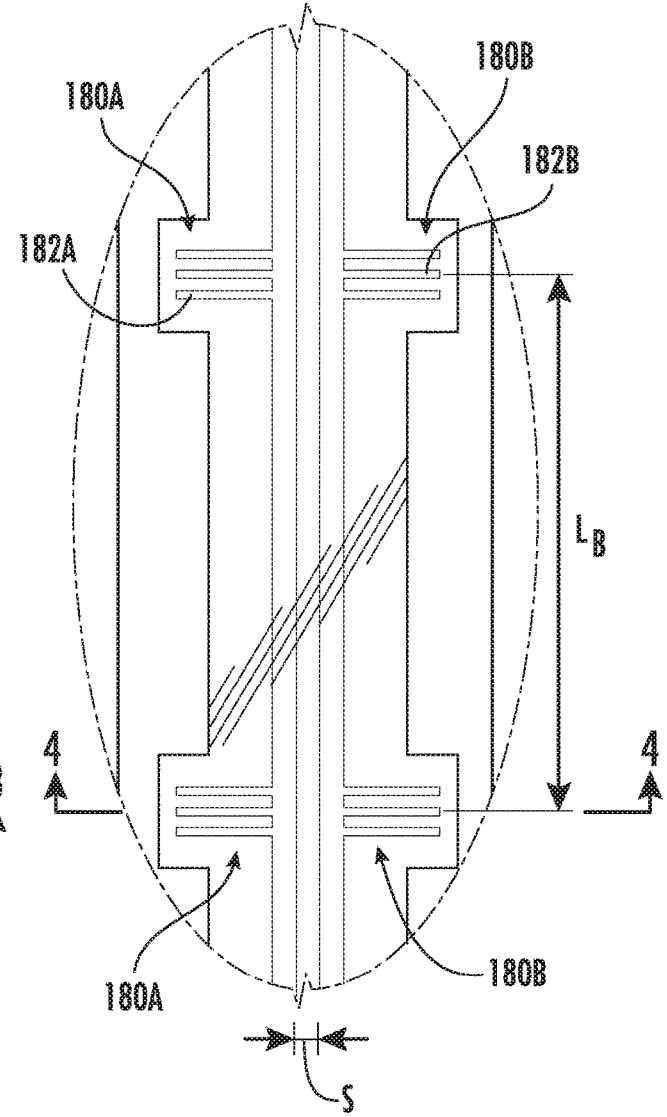
FIG. 2B is an enlarged view of an alternate gauge.

FIGS. 2B and 4 show a variation of the embodiments shown in FIGS. 2A and 3 wherein at specific intervals each axial trace 82A, 82B has a group 180A, 180B of circumferentially-extending branch traces 182A, 182B extending away from the other conductor. These groups have an on-center spacing $L_B$. In operation, traces 182A, 182B act to increase the capacitance between traces 82A and 82B facilitating higher signal to noise ratio and ultimately contributing to better sensor resolution. As shown in FIG. 4, in the variation shown in FIGS. 2B and 4 the widths of the insulative base layer 90 and the encapsulating insulative layer (encapsulant) 94 may be increased to accommodate the circumferentially-extending branch traces 182A, 182B. The embodiments of FIGS. 2B and 4 are otherwise similar to the embodiments of FIGS. 2A and 3 with respect to the elements described above.

In one or more implementations, the fire suppression storage device may have one or more advantages over various alternatives. Some advantages may be cost relative to systems that use floats, because the float tube assembly is eliminated. Other advantages may involve ease of servicing (e.g., by merely replacing a discharge conduit rather than a more complex assembly). Other advantages may be reliability in that there are no moving parts to wear.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A fire suppressant storage device (20) comprising:
   a tank (22) having a first port and an interior for storing a fire suppressant; and
   a discharge assembly mounted to the first port and comprising:
      a discharge valve (48); and
      a discharge conduit (50) at least partially within the interior and having:
         an interior surface (60); and
         an exterior surface (58),
   wherein the discharge assembly further comprises:
      a capacitive gauge (80) on the discharge conduit comprising:
         a first conductor (82A);
         a second conductor (82B) spaced apart from the first conductor;
         a plurality (180A) of first branches (182A) of the first conductor extending away from the second conductor on the discharge conduit; and
         a plurality (180B) of second branches (182B) of the second conductor extending away from the first conductor on the discharge conduit opposite respective said first branches.

2. The fire suppressant storage device of claim 1 wherein the gauge is along the exterior surface.

3. The fire suppressant storage device of claim 1 wherein:
   the first branches are a plurality of groups at intervals along the first conductor; and
   the second branches are a plurality of groups at intervals along the second conductor.

4. The fire suppressant storage device of claim 1 wherein the gauge further comprises:
   a first insulative layer (90) between:
      the first conductor; and
      the discharge conduit; and
   a second insulative layer (94) over the first conductor and the second conductor.

5. The fire suppressant storage device of claim 4 wherein the first and second insulative layers are polymeric layers.

6. The fire suppressant storage device of claim 4 wherein the first and second insulative layers comprise a polyimide.

7. The fire suppressant storage device of claim 1 wherein the gauge further comprises:
the plurality (180A) of first branches (182A) of the first conductor extend circumferentially away from the second conductor; and
the plurality (180B) of second branches (182B) of the second conductor extend circumferentially away from the first conductor opposite respective said first branches.

8. The fire suppressant storage device of claim 1 further comprising:
said fire suppressant within the tank interior, the discharge conduit at least partially immersed in the fire suppressant.

9. The fire suppressant storage device of claim 8 wherein:
said fire suppressant comprises a clean agent.

10. The fire suppressant storage device of claim 8 further comprising:
a compressed gas propellant in a headspace of the tank.

11. The fire suppressant storage device of claim 8 wherein:
the tank has a second port;
a closure (130) seals the second port; and
first (92A) and second (92B) leads from the gauge extend to the closure.

12. The fire suppressant storage device of claim 8 further comprising:
an electronics module (132) electrically coupled to the gauge and comprising a function generator (324) for supplying an AC signal to the gauge.

13. The fire suppressant storage device of claim 12 wherein:
the electronics module is configured to split an output of the function generator between said signal to the gauge and a signal to a reference capacitor (320).

14. A method for using the fire suppressant storage device of claim 1, the method comprising:
applying a voltage across the gauge; and
measuring a response of the gauge.

15. The method of claim 14 wherein:
the applying a voltage comprises applying an AC signal; and
the measuring a response comprises taking a difference between said AC signal and an AC signal applied to a reference capacitor (320).

16. The method of claim 14 further comprising:
from the response, determining a level of said fire suppressant in the tank.

17. A method for manufacturing a fire suppressant discharge assembly, the discharge assembly comprising:
a discharge valve (48); and
a discharge conduit (50) having:
an interior surface (60); and
an exterior surface (58),
the method comprising:
forming, in situ on the discharge conduit, a gauge (80) having a first conductor (82A) and a second conductor (82B), the forming including providing a plurality of branches of the first conductor on the discharge conduit extending away from the second conductor and a plurality of branches of the second conductor on the discharge conduit extending away from the first conductor.

18. The method of claim 17 further comprising:
prior to the forming in situ of the first conductor and the second conductor, forming in situ a first polymeric layer on the discharge conduit; and
after the forming in situ of the first conductor and the second conductor, forming in situ a second polymeric layer over the first conductor, the second conductor, and the first polymeric layer.

19. The method of claim 17 wherein:
the forming in situ of the first conductor and the second conductor comprises spraying.

20. The method of claim 17 further comprising:
connecting respective first and second leads (92A, 92B) to the first and second conductors by conductive paste.

* * * * *